United States Patent Office 3,433,924
Patented Mar. 18, 1969

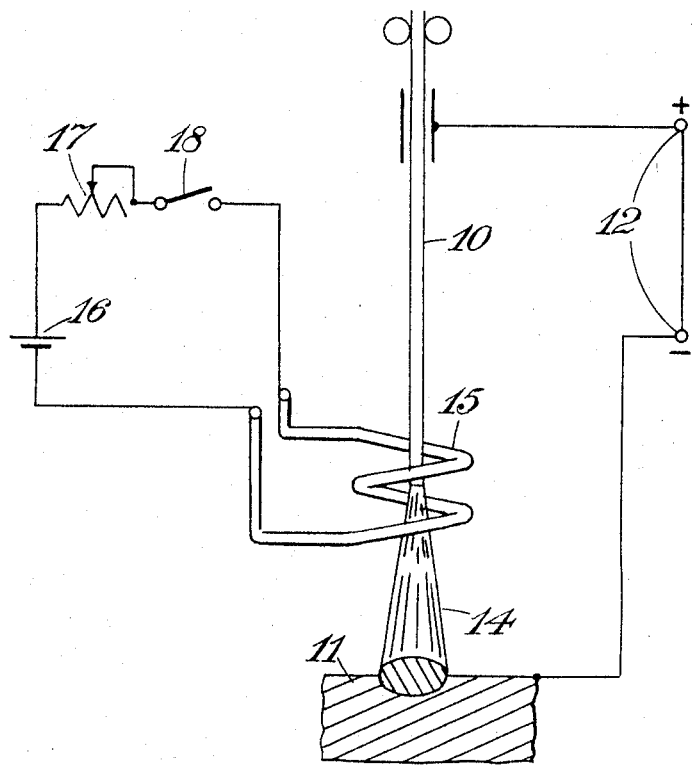

3,433,924
ELECTRIC ARC WELDING APPARATUS
Alexander Jura Sevenco, Burlington, Ontario, Canada, assignor to Lincoln Electric Company Limited, Welwyn Garden City, England, a British company
Filed Dec. 23, 1965, Ser. No. 522,339
Claims priority, application Great Britain, Dec. 24, 1964, 52,479/64
U.S. Cl. 219—123
Int. Cl. B23k 9/08
6 Claims

ABSTRACT OF THE DISCLOSURE

A pulsating unidirectional magnetic field is applied to a consumable electrode with the magnetic field axis substantially parallel to the electrode to control the rate of transfer of metal to the weld in addition to the focusing of the arc by the field.

The invention generally relates to electric arc welding in its various forms (e.g. spray transfer, dip transfer and submerged arc welding). Such welding may take place in the presence of an inert or only slightly reactive shielding gas such as, for example, argon or carbon dioxide, or any appropriate mixture of such gases. Filler metal for the weld may be provided solely by a consumable electrode or by a combination of a separate electrode and filler rod fed into the arc.

The invention provides a method of electric arc welding which comprises superimposing over the region of the arc a pulsating electromagnetic field additional to the field provided by the welding current.

Preferably welding is carried out by spray transfer.

It is further preferred that the pulses of the electromagnetic field occur at a regular frequency.

In one form of the invention welding is carried out in the presence of a shielding gas (e.g. carbon dioxide).

It is further preferred that the pulses are unidirectional, the direction of the magnetic field produced preferably being in the same direction as the welding current which produces a focusing effect on the arc. In some cases, however, it may be preferable for the pulsating magnetic field to be in opposition to the field produced by the welding current. There may be other cases where the pulses are alternating, the electromagnetic field being provided by a variable frequency current whose operating frequency is optimised by the nature of the welding electrode, arc length and current, and such other relevant physical data.

The frequency range of the pulses may be in the range from 1 to 200 and preferably 5 to 50 pulses per second.

The strength of the electromagnetic field provided by the pulses may be up to 500 oersteds.

The mark-space ratio of the pulses may lie between 10 and 70 percent and is often conveniently in the region of 50%.

In a preferred form of the invention the frequency range and/or the field strength and/or the mark-space ratio are adjustable.

The invention further provides electric arc welding apparatus for carrying out the above method and having means to provide an electric arc, means to fill the weld (e.g. a consumable electrode or a filler rod), an electromagnetic coil at the region of the arc and means to energize the coil so as to provide a pulsating field at the arc.

Preferably the energizing means supplies to the coil pulses of energy at a constant frequency. There may be means to supply a shielding gas to the region of the weld.

The coil may be an integral part of a welding torch or gun.

A specific example of welding apparatus according to the invention will now be described.

The apparatus comprises a conventional gas-shielded electric arc welding apparatus with a consumable electrode which is continuously fed to a work-piece. The electrode is surrounded by a magnetic iron tube, on which is wound an electromagnetic coil, or simply by an air-cored electromagnetic coil.

The coil is connected into an electric circuit which supplies to the coil a pulsed direct current, the mark-space ratio of the pulses being of the order of 50 percent. The ratio may be arranged to be adjusted between the range of 10 percent and 70 percent. The field produced by the coil at the weld is arranged to be adjustable between 0 and 500 oersteds. By variation of the supply current to the coil and the direction of the current flowing through, the coil can be reversed so that the field produced by the coil may assist or oppose the field produced by the welding current. The pulses are supplied at a predetermined regular frequency and this frequency can be adjusted to be between 1 and 200 pulses per second.

In use of the apparatus welding current is supplied in the electrode and the energy available at the weld is arranged to be so great that spray transfer welding takes place. The pulsed field provided by the coil controls the metal transfer from the electrode to the work-piece giving more controlled contours to the weld as well as decreasing the amount of spatter.

Increase of the field strength produced by the pulse is capable of increasing the spread of the weld.

The appearance of a weld produced using an apparatus and method according to the invention is much improved due to the more regular deposition of the metal.

The accompanying diagrammatic drawing illustrates the specific examples of welding apparatus just described.

An electrode wire 10 is fed continuously to a work-piece 11, the wire and the electrode being connected electrically to a power source 12 which provides the welding current.

The lower end of the electrode wire and part of the arc 14 are surrounded by an electromagnetic coil 15 connected into an electric circuit comprising a power source 16, a variable resistance 17 and a motor driven commutator switch 18 which is arranged to be opened and closed at a predetermined rate.

I claim:
1. Electric arc spray welding apparatus, comprising:
   a consumable electrode;
   driving means for driving said electrode towards the weld;
   electrical power source means connected to the weld and the electrode to provide an electric arc therebetween;
   an electromagnetic coil having its axis arranged substantially parallel to the electrode and energized to provide a magnetic field in the region of the arc having a focusing effect on the arc, and
   pulse generator means connected to the electromagnetic coil to provide a unidirectional pulsating current therein to control the rate of transfer of weld metal to the weld.
2. Electric arc welding apparatus as claimed in claim 1 wherein the frequency range of the pulses is in the range from 1 to 200 pulses per second.
3. Electric arc welding apparatus as claimed in claim 1 wherein said pulsating current has a frequency range of 5 to 50 pulses per second.
4. Electric arc welding apparatus as claimed in claim 1 in which the mark-space ratio of the pulses is between 10 and 70 percent.
5. A method of electric arc spray welding comprising the steps of:

driving a consumable electrode towards a weld,
applying an electric arc between the weld and the consumable electrode,
focusing the arc by forming a magnetic field in the region of the arc,
controlling the rate of transfer of weld metal to the weld by providing a unidirectional pulsating magnetic field having a pulse rate of between 5 to 50 pulses per second.

6. A method as claimed in claim 4 in which the mark-space ratio of the magnetic field is between 10 and 70 percent.

References Cited

UNITED STATES PATENTS

| | | | |
|---|---|---|---|
| 1,796,969 | 3/1931 | Strobel | 219—123 |
| 1,963,869 | 6/1934 | Sandelowsky et al. | 219—123 |
| 2,844,705 | 7/1958 | Bowman et al. | 219—123 |
| 2,920,183 | 1/1960 | Greene | 219—123 |
| 2,944,140 | 7/1960 | Giannini et al. | 219—123 |
| 3,102,946 | 9/1963 | Fonberg | 219—123 |
| 3,294,954 | 12/1966 | Ramsey | 219—123 |

RICHARD M. WOOD, *Primary Examiner.*

W. D. BROOKS, *Assistant Examiner.*